United States Patent [19]

Bickers

[11] 3,960,173
[45] June 1, 1976

[54] EXHAUST VALVE FOR A MOLD AND CORE BLOWING MACHINE

[75] Inventor: Fredrick Allen Bickers, Neponset, Ill.

[73] Assignee: Martin Engineering Co., Neponset, Ill.

[22] Filed: Mar. 27, 1975

[21] Appl. No.: 562,432

[52] U.S. Cl. .............................. 137/550; 210/429; 164/200
[51] Int. Cl.² ........................................ B01D 35/02
[58] Field of Search ..................... 137/550; 251/63; 210/429, 431, 432; 164/200, 201, 202; 425/85, DIG. 60

[56] References Cited
UNITED STATES PATENTS

| | | |
|---|---|---|
| 2,545,944 | 3/1951 | Ellms ................................ 164/201 |
| 2,633,149 | 3/1953 | McKenna ........................... 210/431 |
| 2,939,466 | 6/1960 | Hill ................................. 251/63 X |
| 3,178,150 | 4/1965 | Johnson ............................. 251/63 |
| 3,778,024 | 12/1973 | Rogerson ........................... 251/63 |

*Primary Examiner*—Henry T. Klinksiek
*Attorney, Agent, or Firm*—Mann, Brown & McWilliams

[57] ABSTRACT

This invention relates to an exhaust valve to remove air under pressure from the sand magazine of a core or molding machine apparatus which reduces the noise of the exhaust and which includes a housing member for a reciprocable piston that controls an exhaust port of substantial size in such housing and a screen housing projecting through the wall of the sand magazine with a screen mounted in the screen housing to filter incoming air through a relatively large inlet port.

7 Claims, 2 Drawing Figures

EXHAUST VALVE FOR A MOLD AND CORE BLOWING MACHINE

BACKGROUND OF THE INVENTION

Heretofore, more or less standard exhaust valves have been utilized to remove air from the sand magazine area of mold and core blowing machines and some equipment could blow, cure and strip the core from the core box without moving the box horizontally but all such equipment had to raise and lower from the blow plate. This function could not be accomplished after the core box was raised and blown until all of the air was exhausted from the sand magazine through one or more of the exhaust valves. The exhaust valves consistently were provided with small inlet and outlet ports and as a consequence generated considerable noise because adequate means for silencing or muffling the exhaust could not be provided. The small porting resulted in the use of relatively small mufflers which were ineffective because of their small size and which also lengthened the time required to remove the air from the area of the sand magazine. This, of course, had the effect of lowering the overall production output from the machine. Manufacturers, of course, desire to reduce the noise in their foundry operations for the benefit of the employees in these areas and to improve relations with employee unions but they want to accomplish this without adversely affecting their total production and without reducing their profit potential. The relatively small effective size of prior exhaust valves resulting from the small size porting used caused an undue amount of downtime for cleaning the valves.

SUMMARY OF THE INVENTION

The present exhaust valve concept completely eliminates the objectionable noise and substantially reduces the downtime required to maintain the valve in efficient operating condition so that the machine can be operated at maximum capacity. The inlet port utilized in the exhaust valve of this invention is of maximum size and the exhaust port similarly is of large size so that a silencer or muffler of large size can be used whereby the noise is reduced to a readily acceptable level and which is accomplished without restricting the air flow through the exhaust valve and the system. Further, the noise can be eliminated entirely by dispensing with the muffler and connecting the exhaust port directly to a duct and conduct the exhaust air away from the machine and out of the foundry area. As a means of further improving the operation of the present valve with a minimum of maintenance the filter screen is located in the screen housing in a position to avoid any area where the sand normally becomes compacted but is disposed where the sand is always loose and moving continuously toward a core box. This precludes the availability of any area where the sand can become stagnant and eventually solidify. The screen, because of this location, will accumulate a coating of resin from the sand mix flowing through the screen and as a result will not erode.

OBJECTS OF THE INVENTION

The primary purpose of this invention is the improvement of the operation of mold and core blowing machines by the use of one or more exhaust valves each having an inlet port and an exhaust port of relatively large size for free flowing air through the valve from a sand magazine and having a filter screen in the valve located to avoid any possibility of the flowing sand to stagnate and solidify.

The principal object of the invention is the provision of an exhaust valve having large size inlet and outlet ports for operative association with the sand magazine of a mold and core blowing machine.

An important object of the invention is to provide an exhaust valve for the sand magazine of a mold and core blowing machine having a filter screen located in the exhaust valve to prevent stagnation of sand flowing through the valve and thereby avoid solidification of the sand and clogging of the valve.

A further object of the invention is the provision of an exhaust valve for attachment to a sand magazine having a housing member enclosing a reciprocable piston and a screen housing of larger size than the housing member and containing a filter screen.

Another object of the invention is to provide an exhaust valve including a housing member enclosing a reciprocable piston and a screen housing having an annular piston seat extending into the housing member and secured relative to the housing member by the attachment of the housing member to a sand magazine.

Still another object of the invention is the provision of an exhaust valve having a housing member enclosing a reciprocable non-metallic piston and a non-metallic screen housing having an annular piston seat for the non-metallic piston.

DESCRIPTION OF THE DRAWINGS

The foregoing and other and more specific objects of the invention are attained by the exhaust valve construction and arrangement illustrated in the accompanying drawings wherein.

DESCRIPTION OF PREFERRED EMBODIMENT

Figure 1:
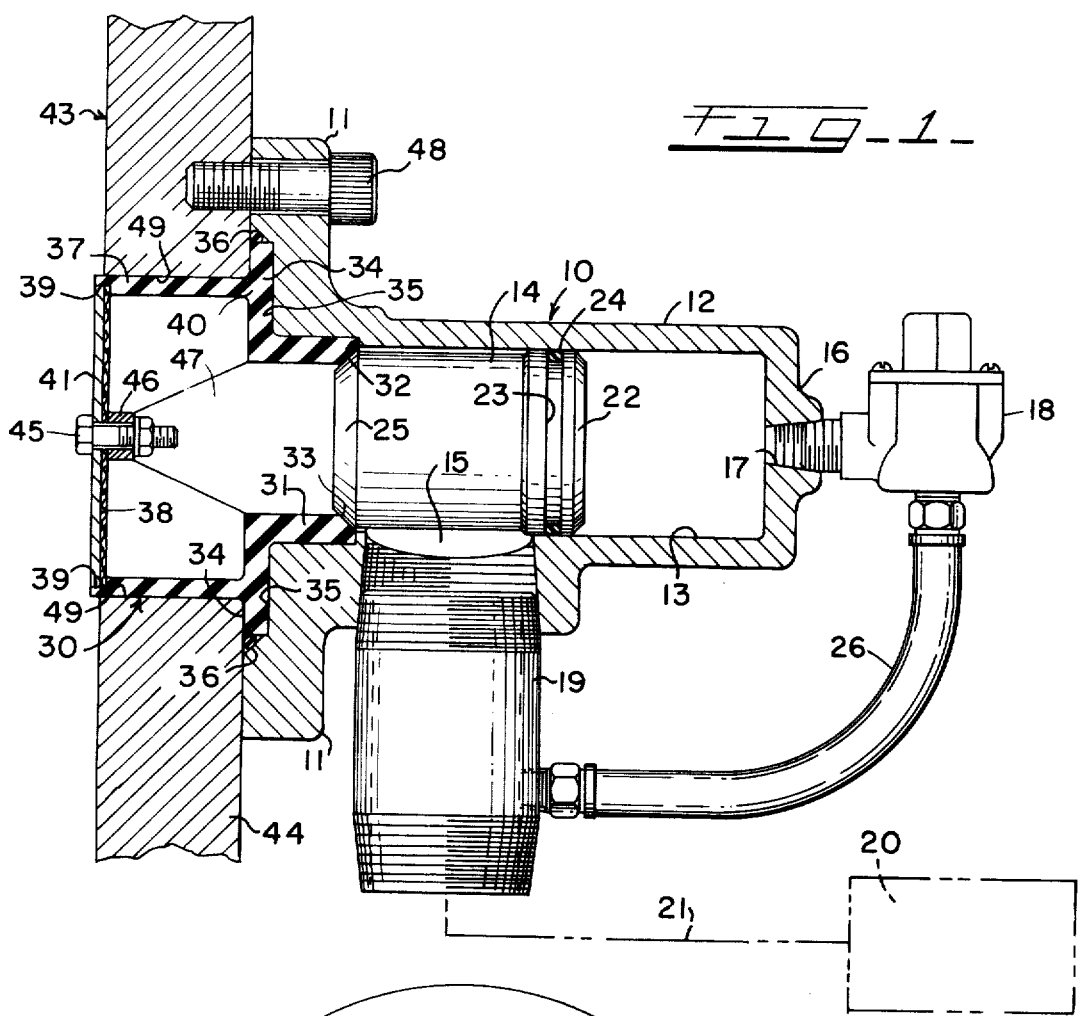
FIG. 1 is a cross sectional view illustrating the exhaust valve of this invention attached to the wall of a sand magazine.
Figure 2:
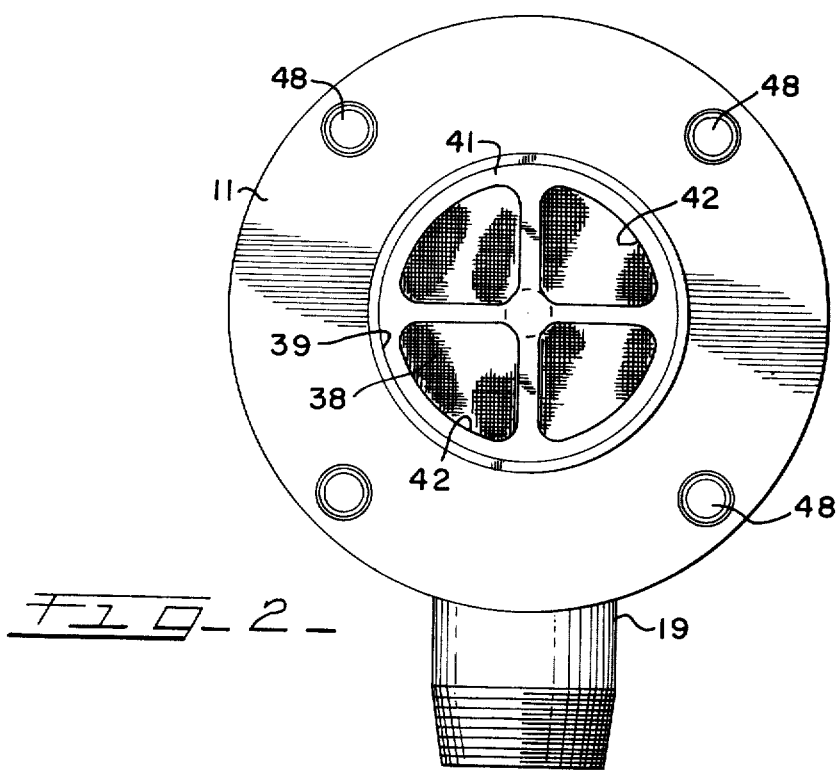
FIG. 2 is an end elevational view of the exhaust valve.

In the drawings 10 represents an exhaust valve having a mounting flange 11 and a housing member 12 containing a central bore 13 wherein a reciprocable piston 14 is disposed for sliding movement between the position shown, covering the exhaust port 15, and a release position adjacent the end wall 16 of the housing member. The end wall 16 includes a fluid port 17 in which a quick acting valve 18 is mounted and which controls the movements of the piston 14 between the release position and the closed position closing off the exhaust port 15. The exhaust port 15 is fitted with a connection 19 affording communication with a large size silencer or muffler 20 through a suitable conduit or duct 21.

The piston 14 is provided with a head portion 22 containing a groove 23 encircling the piston head and in which an O-ring 24 is mounted to provide an appropriate sliding seal between the piston and the central bore 13. The piston 14 preferably is non-metallic and as shown herein is constructed from Buna N rubber and the O-ring seal 24 is similarly fabricated from Buna N rubber. At the opposite end of the piston 14 a chamfer 25 is provided around the edge of the piston and which is adapted to engage a piston seat to provide an effective seal at this point. When the pressure in the central bore between the piston head 22 and the end wall 16 is released by the operation of the quick acting valve 18 the piston can move toward the end wall 16 and thus uncover the exhaust port 15. As shown in FIG. 1, the quick acting valve 18 when activated discharges into the exhaust connection 19 by means of a suitable hose fitting 26 operatively connecting the valve 18 with the connection 19.

The exhaust valve assembly 10 includes a separately formed screen housing 30 and whereas the valve body 10 is of metallic construction, fabricated from cast aluminum, the screen housing 30 is non-metallic and fabricated from a moldable thermoplastic material selected from the group including polyethylene, polypropylene, and polyvinyl chloride. The screen housing 30 is assembled in interfitting relationship with the valve body 10 and any air this purpose is provided with a piston seat forming inward projection 31 extending into the valve body and engaging an annular shoulder 32 in the central bore. The inwardly projecting portion 31 at its inner end is provided with a chamferred surface 33 affording an annular seat for the chamferred inner end 25 of the piston 14. When the piston is in the inward, or closed position, overlying the exhaust port 15 the chamferred end 25 of the piston tightly engages chamferred seat 33 of the screen housing projection 31 and provides an effective seal against the escape of any past the seal.

The screen housing includes a base flange 34 which fits into a complemental recessed area 35 provided in the attaching flange 11 of the valve body and an O-ring 36 around the edge of the flange 34 effectively seals the joint between the flange 34 and the surrounding recess 35. A relatively large screen housing portion 37 extends outwardly from the base flange 34 and forms the screen chamber in which a multiple wire mesh screen 38 is mounted. This screen, in practice, is comprised of a stainless steel wire screen of 150 mesh backed up by a similar wire screen of 30 mesh. The screen, as shown, is mounted in a recess 39 with large screen housing 37 disposed substantially flush with the inside face of the housing. However, the screen might be mounted adjacent to the inner wall 40 of the screen housing or at lug position between those two locations. The screen 38 is secured in the recess 39 by a face plate 41 having surface openings 42 for the passage of air and sand from a sand magazine 43 on which the exhaust valve 10 is mounted. Only a portion of one wall 44 of the sand magazine 43 is shown and this sand magazine is operatively associated with a mold and core blowing machine apparatus as typically represented in the art. The screen securing face plate 41 is clamped over the screen 38 by a centrally disposed bolt 45 extending through a lut 46 integral with the screen housing by means of webs 47 and fastened by a nut and lock washer on the inner side.

The non-metallic screen housing structure is assembled into the valve body 10 with the annular valve seat extension 31 entered in the valve body opening concentric with the central bore 13 and the flange 34 entered into the recess 35 and this assembled relationship is maintained in the applied position of the exhaust valve on the sand magazine 43 by the cap screws 48 mounting the exhaust valve on the magazine wall 44. The assembled valve body 10 and screen housing 30 are disposed on the outside face of the wall 44 with the flange 34 of the screen housing clamped between the valve body and the face of the wall by the action of the cap screws 48 with the screen housing 30 projecting through an opening 49 in the wall into the sand magazine. Thus, the air in the magazine 43, which is under pressure, will pass through the exhaust valve 10 when the sliding piston 14 is actuated to uncover the exhaust port 15 whereby the air and any sand that it carries will be discharged through the fitting 19 into duct 21 to be conducted away from the foundry area and discharged to atmosphere through a suitable cleaner or through a muffler.

FINAL SUMMARY

In the use of this invention the exhaust valve assembly is mounted on the wall of a sand magazine associated with a typical molding machine apparatus to exhaust air from the magazine after a core is blown and the core box ready to be transferred to a "cure-and-strip" station. The core box must raise and lower from the blow plate but this function cannot be performed until all the air has been exhausted from the sand magazine. The present exhaust valve provides a large intake port from the sand magazine through the screen 38 and a large exhaust port 15 whereby the air is removed from the magazine quickly and thoroughly without restricting speed of the flowing air and maintaining the interior of the exhaust valve assembly in the cleanest possible condition by allowing substantially all of the sand carried by the flowing air to escape and thus avoid unnecessary wear on various parts of the assembly. The large ports also enable the use of large mufflers to allow a freer flow of the air for the most efficient operation of the system. The screen location as disclosed also eliminates the possibility of sand flowing past the screen becoming stagnant and compacted as the screen surface is now flush with normal sand flow and the area of possible stagnation has been eliminated. With previous exhaust valve arrangements this could occur after about an hour of production operation and then the air flowing through the valve had to pass through this virtually solid mass which became quite similar to porous concrete and necessitated the shut-down of the machine and cleaning of the exhaust valve. The present exhaust valve avoids the necessity for these frequent shut-downs by reasons of the large ports which rapidly vent the entire area of the exhaust valve and thereby avoid the build-up or accumulation of sand in the valve and by the filter screen 38 which is located in the screen housing 30 in a position where the air and sand are continuously flowing and designed to avoid any possibility of stagnation so that the sand mix cannot solidify and clog the valve. By locating the screen where the air is constantly moving and the sand is loose the efficient operation of the exhaust valve is maintained over much longer operating periods.

The valve provides quicker exhaust of air from the sand magazine through screen cleanliness resulting in reduced machine cycles time and greater production output. The valve design further allows noise reduction insofar as the exhausted air from both magazine exhaust valve and quick exhaust valve can be muffled or vented to a remote ductwork away from the operating area.

What is claimed is:

1. An exhaust valve for a molding machine apparatus adapted to be mounted on a wall of a sand magazine and to exhaust air under pressure from the magazine to atmosphere, said exhaust valve including a housing member having a central bore, a piston reciprocable in said bore, an exhaust port in communication with the central bore adapted to be closed off by said piston, a screen housing extending into said wall and having an annular piston seat projecting into said central bore of said housing member, a screen mounted in said screen housing, means to secure the assembled housing member and screen housing to said wall, and a fluid port in communication with said central bore at one side of said piston whereby said piston is actuated to move away from said seat and uncover said exhaust port, said screen housing being of larger size than said annular piston seat requiring an opening in said wall larger than the diameter of said central bore, said screen housing and annular piston seat being fabricated integrally and a flange on the screen housing clamped between said housing member and said wall by said securing means, said screen housing projecting through said wall into said magazine, and said screen is mounted in said screen housing in a position substantially coincident with a face of said wall.

2. An exhaust valve as set forth in claim 1 wherein said screen is disposed substantially flush with the face of said wall at the inner side of said magazine.

3. An exhaust valve as set forth in claim 1 wherein removable means secures said screen in said position.

4. An exhaust valve as set forth in claim 1 wherein said screen housing and annular piston seat are fabricated from a moldable thermo-plastic material selected from the group including polyethylene, polypropylene, and polyvinyl chloride.

5. An exhaust valve as set forth in claim 1 wherein said screen is mounted in the screen housing adjacent to the inner end of such housing projecting through said wall.

6. An exhaust valve as set forth in claim 1 wherein said piston is fabricated from a non-metallic material.

7. An exhaust valve for a molding machine apparatus adapted to be mounted on a wall of a sand magazine and to exhaust air under pressure from the magazine to atmosphere, said exhaust valve including a housing member having a central bore, a piston reciprocable in said bore an exhaust port in communication with the central bore adapted to be closed off by said piston, a screen housing extending into said wall and having an annular piston seat projecting into said central bore of said housing member, a screen mounted in said screen housing, means to secure the assembled housing member and screen housing to said wall, a fluid port in communication with said central bore at one side of said piston whereby said piston is actuated to move away from said seat and uncover said exhaust port, a quick acting valve mounted in operative association with said fluid port to control the actuation of said piston, and means operatively connecting said exhaust port to an exhaust silencer, said quick acting valve having an operative connection to said last named means.

* * * * *